Dec. 25, 1956 G. V. HALL ET AL 2,775,403

SIGN DETECTION MEANS FOR "CRAWL" CARRY REGISTERS

Original Filed Nov. 9, 1951 3 Sheets-Sheet 1

INVENTORS
GEORGE V. HALL
WALTER S. OLIWA
BY George H. Lorch
ATTORNEY

SIGN DETECTION MEANS FOR "CRAWL" CARRY REGISTERS

Original Filed Nov. 9, 1951 3 Sheets-Sheet 2

INVENTORS
GEORGE V. HALL
WALTER S OLIWA
BY George H Lorch
ATTORNEY

SIGN DETECTION MEANS FOR "CRAWL" CARRY REGISTERS

Original Filed Nov. 9, 1951

INVENTORS
GEORGE V. HALL
WALTER S. OLIWA
BY George H. Lorch
ATTORNEY

United States Patent Office 2,775,403

Patented Dec. 25, 1956

2,775,403

SIGN DETECTION MEANS FOR "CRAWL" CARRY REGISTERS

George V. Hall, East Orange, and Walter S. Oliwa, Summit, N. J., assignors to Monroe Calculating Machine Company, Orange, N. J., a corporation of Delaware Continuation of application Serial No. 255,645, November 9, 1951. This application October 3, 1952, Serial No. 313,012

7 Claims. (Cl. 235—61)

This application is a continuation of application Serial No. 255,645 filed on November 9, 1951, now abandoned.

The invention relates to registers having tens transfer mechanism of the "crawl" type, and more particularly to means whereby change of such a register to or from a positive, negative, or zero condition may be detected without the necessity of moving the register wheels to aligned or reading position.

It is well known in the art that a change in the arithmetical sign of a calculating machine register may be utilized to control certain of the machine operations. For example, in the performance of a division calculation by the well known subtract, add, shift method, the registering mechanism is cycled subtractively until the dividend is reduced to a negative value, and thereupon the subtractive registration is terminated. A plus corrective cycle of the registering mechanism is then instituted, after which the register carriage is shifted and the program continued.

Upon change of the sign in registers having "jump" tens transfer mechanism, the tens transfer from lower to higher order wheels is extended toward the left as far as such transfer mechanism is provided. A signal upon change of the sign of the register, therefore, may be taken from the highest order wheel aligned with the keyboard upon passage of the wheel from 0 to 9 or from 9 to 0 by relatively simple sign detecting mechanism.

In registers having "crawl" tens transfer mechanism, the continuously engaged transfer gearing between the wheels and the continuously driven differential actuators adapts such registers for a higher speed of operation than is practical with intermittently driven registers of the "jump" transfer type. However, in "crawl" transfer registers, appreciable transfer movement is imparted only to the next higher order wheel from a lower order wheel and due to lost motion, no movement at all is imparted to still higher order wheels. Therefore, should actuation of a lower order significant wheel be effective to change the sign of the register, a signal may be taken from the highest order wheel only if the wheels are moved to aligned or reading position.

In the use of adding, listing bookkeeping machines having registers of the "crawl" transfer type, it is obviously desirable that the operator should know at all times whether a particular register is in a positive, zero, or negative condition and thus avoid the necessity of a total taking operation to determine such condition.

In view of the foregoing, one form of the invention provides an electric signaling circuit adapted for association with each of the wheels of a "crawl" transfer register. A signal responsive device is common to all of the circuits, and switching means adjustable in accordance with the values registered in the wheels controls the circuits. Upon passage of the register from positive to negative condition, the circuit associated with the highest order wheel is completed or the circuit of a lower order wheel is completed by series connection with the switching means of all of the higher order wheels.

In an alternate form of the invention, both a positive and a negative signaling circuit is associated with each of the wheels and a positive circuit is completed and a negative circuit is broken upon change of the register from negative to positive and conversely upon change from positive to negative condition. Furthermore, a zero circuit is completed when all of the wheels are at zero registering position. The invention, however, will best be understood from the following description with reference to the accompanying drawings in which.

*Electric overdraft signifying circuits*

Figures 1, 2, 3, 4:
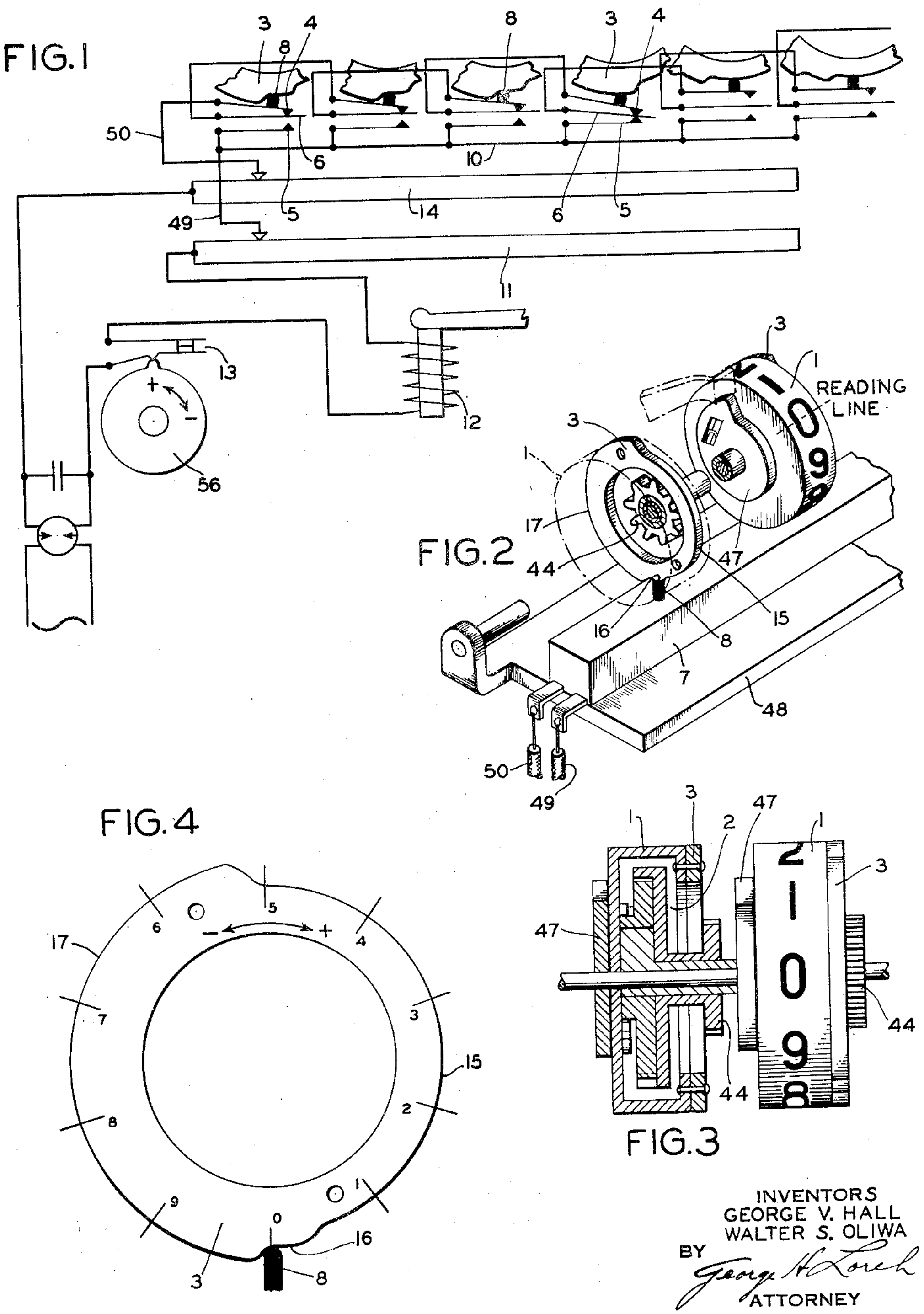
Fig. 1 is a schematic view of the electric sign signaling circuits as adapted to control a program of division in a calculating machine having a "crawl" tens transfer product-dividend register.
Fig. 2 is a fragmentary perspective view of one of the register wheels, the switch control cam associated therewith and the switch control cam of the next higher order wheel.
Fig. 3 is an enlarged detail view, partly in section, of two adjacent numeral wheels.
Fig. 4 is an enlarged side elevation of one of the switch control cams.

The register comprises a series of ordinally arranged numeral wheels 1 (Figs. 2 and 3). Any well known type of "crawl" tens transfer mechanism may be interposed between the wheels. Such a mechanism may be of the orbital type fully disclosed in Gardner Patent No. 1,828,180, and is designated generally by the reference numeral 2 (Fig. 3). Each of the register wheels has a switch control cam 3 fixed for rotation therewith and operable to control switching means for the electric signaling circuits as hereinafter described.

Figure 5:
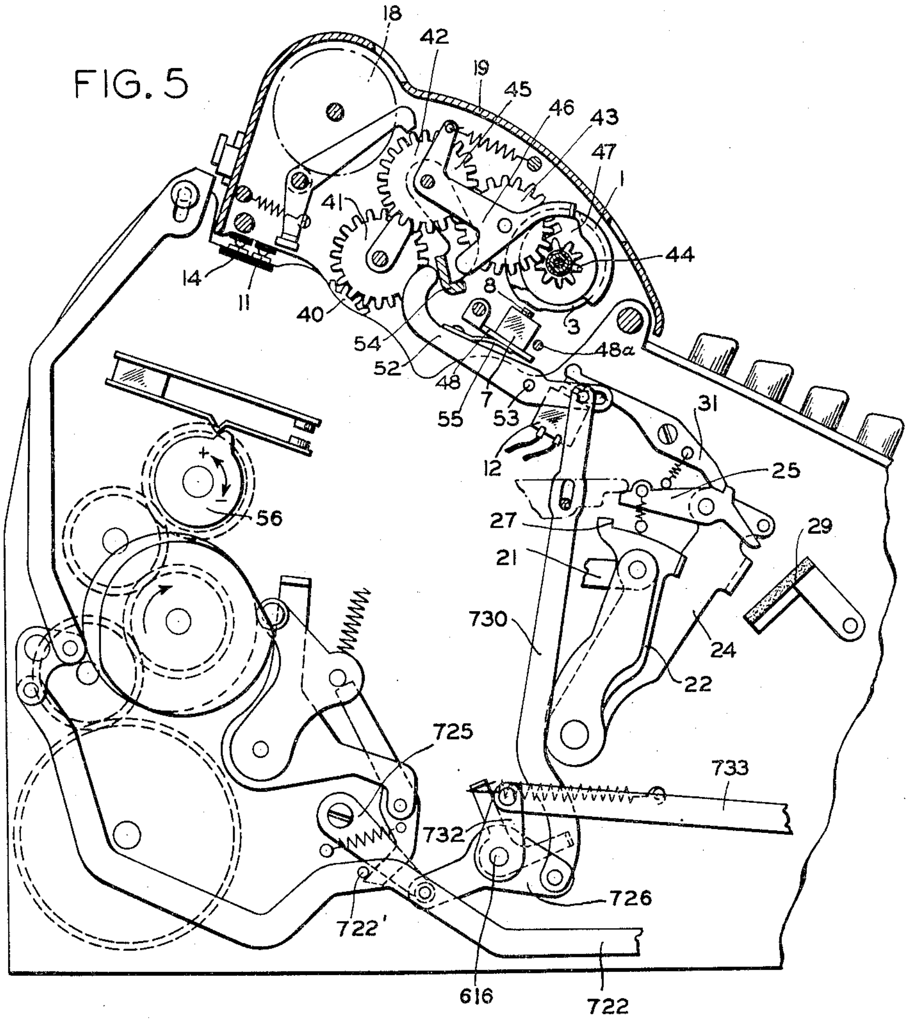
Fig. 5 is a fragmentary left side elevation of a calculating machine embodying the invention with the carriage for the "crawl" tens transfer register in section.

A switching means (Fig. 1) is controlled by each control cam 3 and any one of the switching means is operable to complete one of the circuits upon change of the register to negative registering condition. Each of the switching means comprises a zero signifying contact 4, a negative signifying contact 5, and a center contact 6 interposed between the zero and negative contacts. The switches are self-biased toward open position as shown in the two lowest orders (Fig. 1) and are preferably, but not necessarily, of the type which snap to open or to closed position. These types of switches are well known in the art as micro-switches and are usually enclosed in a Bakelite or other suitable insulating casing 7 (Figs. 2 and 5). An insulating pin 8 is attached to each zero contact 4 and extends upwardly through casing 7 into engagement with the associated control cam 3.

It is desirable to have immediate current flow upon closure of the circuits. Therefore, should there be no source of direct current available for the circuits, such current may be furnished from an alternating current source by the inclusion of a full wave rectifier and a condenser as indicated in Fig. 1. A conductor 10 is common to all of the circuits and is connected to one side of the power source through a sliding connection with a conductor 11, the winding of a relay 12, and a master switch 13. However, relay 12, switch 13, and the sliding connection are essential only in connection with the control of a program of division hereinafter described. Therefore, another electroresponsive indicating device, i. e., a light, a bell, etc., may be substituted for relay 12. Also, in connection with the immediate description, it may be assumed that switch 13 is in permanently closed position and, therefore, in effect eliminated from the line, and that conductor 10 has direct connection through the winding of the electroresponsive device 12 with one side of the power source.

Each negative signifying contact 5 is connected with the common conductor 10 and, therefore, with one side of the power source. The zero signifying contact 4 of the highest order switching means is connected to the other side of the power source through a sliding connection with a conductor 14. Also, this sliding connection is essential only in connection with the aforementioned division program. The center contact 6 of each of the switching means is connected to the zero signifying contact 4 of the next lower order switching means. Therefore, should a successive series of the highest order zero contacts 4 be made with their associated center contacts 6, the contacts 6 would be connected in series with one side of the power soure by the connection of zero contact 4 of the highest order switching means with the power source. It will, therefore, be seen that if any one of the serially connected center contacts 6 is made with the associated negative signifying contact 5, a circuit will be completed through common conductor 10 which is connected with the other side of the power source.

*Control of the overdraft signifying circuits*

For reasons hereinafter disclosed, the highest order wheel of the register comprises a dummy or overflow control wheel in which no digital registration is effected but only the "crawl" transfer from the next lower order wheel. Digital registration may be effected in all of the other wheels by differential actuators (not shown) of any well known construction such as the rotary type in which registration is effected continuously throughout a complete cycle of operation; the wheels being driven at speeds proportional to the digital values being registered.

Switch control cams 3 (Figs. 2, 3, and 4) each have what may be termed a positive zone of control comprising a dwell 15 of least diameter, a zero zone of control comprising a dwell 16 of intermediate diameter and a negative zone of control comprising a dwell 17 of greatest diameter. In Fig. 4, the digital value numerals on the cam indicate the portions of the cam edge which will engage switch control pin 8 when those values are registered on the associated numeral wheel. The zero dwell extends from 0 to approximately .3, the positive dwell from .5 to 5, and the negative dwell from 5.3 to 9.8 registration. Although the range of the dwells is not arbitrary, some latitude is permissible. Also, it will be obvious hereinafter that the positive and negative dwells could be interchanged by modifying the operation of the switching means.

When a pin 8 of a contact 4 is engaged by the positive dwell 15 of the associated cam 3, center contact 6 will be permitted upward movement from engagement with negative contact 5 and zero contact 4 will be permitted upward movement from engagement with the center contact 6 as shown by the lowest order switching means (Fig. 1). When pin 8 is engaged by the zero dwell 16, contact 4 will be moved downward to engage center contact 6 and thereby effect a connection with the next lower order contact 4 as shown by the highest order switching means. When pin 8 is engaged by the negative dwell 17, contact 4 will be moved further downward thereby moving center contact 6 downward into engagement with contact 5 to make the connection with common conductor 10 as shown by the fourth highest order switching means.

It will be recalled that digital values are not registered in the highest order or overflow numeral wheel. It will be assumed, for example, that the wheel adjacent the overflow wheel is moved in a positive direction to register any digital value no greater than 5. The positive dwell 15 of the associated cam 3 will engage pin 8 of the associated switching means. Therefore, both contacts 4 and 5 will be disengaged from center contact 6. The "crawl" tens transfer will move the overflow wheel to a maximum of .5. Therefore, either the zero or the positive dwell of its cam will engage pin 8 and through contact 4 may engage contact 6. However, contact 6 will be disengaged from contact 5 and there will be no completed circuit through common conductor 10 to the power source. Now it will be assumed that the wheel adjacent the overflow wheel is moved in a positive direction to register any value of from 6 to 9, the negative dwell 17 of its cam 3 will engage pin 8 thereby closing both contacts 4 and 5 and connecting the switching means to common conductor 10 and to one side of the power source. The transfer, however, will have moved the overflow wheel to a registering position of from .6 to .9 and thus will have moved its cam definitely into its positive controlling range. The associated contacts 4 and 5 will therefore be opened and there will be no connection to the other side of the power source. It will be noted that a higher order wheel takes over the control from the next lower order wheel as the lower order wheel passes from a positive registration of 4 to a registration of 5. Upon a registration of 5 it will be seen that the cam of the wheel is still within its positive controlling range wherein there is no connection with conductor 10. Therefore, there is considerable overlapping of the control of two adjacent wheels thereby providing a definite control even though there may be considerable lost motion in the transfer mechanism.

The operation of the switching means will now be considered upon movement of the wheel adjacent the overflow wheel to a negative value. Upon movement of the wheel negatively to any value of from 9 to 6, the negative dwell of its cam will engage pin 8 of the associated switching means. Therefore, contacts 4 and 5 will be closed, thereby making a connection with conductor 10 and one side of the power source, and a connection with center contact 6 of the overflow wheel. The overflow wheel will therefore be at from 9.9 to 9.6 registering position and its contact 4 which is connected to the other side of the power source will be engaged with its center contact 6 and, therefore, a circuit will be completed through the switching means of the two wheels even though the crawl transfer has been insufficient to close contact 5 of the overflow wheel. If the wheel adjacent the overflow wheel is moved negatively to the 5 position or beyond, the crawl transfer will definitely move the overflow wheel to bring its cam into the negative controlling range to close both of its contacts 4 and 5. Therefore, an overdraft signaling circuit will be completed although the circuit through the next lower order switching means is broken.

Should a successive series of the higher order wheels including the overflow wheel stand at 0 as indicated by the three higher orders (Fig. 1), contacts 4 of each order will be engaged with its contact 6, thereby connecting contacts 6 in series with one side of the power source. If the next lower order wheel is passed negatively through 0, a circuit will be completed to indicate an overdraft as shown in Fig. 1. If, however, the wheel contains a positive value, there will be no completed circuit. It will be understood that the next higher order wheel at times takes over the control to either make or break a circuit as described in connection with the overflow wheel.

*Control of the division program*

The control of a program of division is herein disclosed to illustrate a practical application of the electric sign signaling circuits of the invention.

The partially illustrated calculating machine, including division control mechanism (Fig. 5), operates substantially in accordance with the disclosure of Patent No. 2,531,207, issued on November 21, 1950, to Herman Gang as modified by the devices of the present invention. Only the parts of the mechanisms which are correlatively operable with the devices of the invention are described and illustrated and those parts are herein given the same reference numerals as those applied to the equivalent parts in the patent. Reference is made to this patent for a complete disclosure of the calculating machine and its operation in connection with a program of division.

The product-dividend register of the above noted patent is provided with tens transfer mechanism of the "jump" type. Division is effected by the well known subtract, add, shift method in which the divisor set on the keyboard (Fig. 5) is subtracted once more than it is contained in the corresponding portion of the dividend registered in the product dividend register. A negative numeral wheel reading is therefore obtained and the tens transfer mechanism will successively move the register wheels from 0 to 9 as far toward the left as such transfer mechanism is provided. This transfer is utilized to trip the control devices to terminate the subtractive operation, whereupon the actuating means is reversed for positive registration. Positive registration will be limited to a single cycle by a second transfer to trip the control devices. The excessive subtraction will therefore be corrected and the count corrected in wheels 18 (Fig. 5) of the multiplier-quotient register, thus leaving the correct quotient digit registered therein. The register carriage 19 will thereupon be shifted one order to the left and subtractive actuation initiated, thereby resuming the sequence of operations.

In accordance with the present invention, a product-dividend register comprising the aforedescribed numeral wheels 1 of the "crawl" transfer type is substituted for the register of the aforenoted patent. Input gears 40 of reversible rotary differential actuators in the base of the machine effect digital actuation to the numeral wheels through transmission trains comprising gears 41, 42, 43 and pinions 44 (Figs. 2 and 5) of the numeral wheels. The actuating mechanism may be of any well known type in which the registering operation is effected throughout each complete cycle of operation at speeds varying in proportion to the digital values being registered.

Means for moving wheels 1 to aligned or reading position operates substantially in accordance with the disclosure of Patent No. 2,089,682, issued to George C. Chase on August 10, 1937. This is accomplished by movement of transmission gears 43 about shaft 45 as a center to counteract the partial tens transfers. Each gear 43, except that of the lowest order wheel, is mounted on an arm 46 which is pivotally mounted on shaft 45. Each arm 46 has at its free forward end a laterally extending lug adapted for engagement with a snail cam 47 (Figs. 2 and 5) attached to the next lower order wheel. During operation of the machine, the lugs of arms 46 are held upward a slight distance from the position shown in Fig. 5, as hereinafter described, to prevent interference with cams 47. At the end of an operation, arms 46 are spring moved downwardly until their lugs engage the cams of the next lower order wheels. Therefore, gears 43 will be moved around gears 42 imparting movement to pinions 44 to back out the partial tens transfers.

Figure 6:
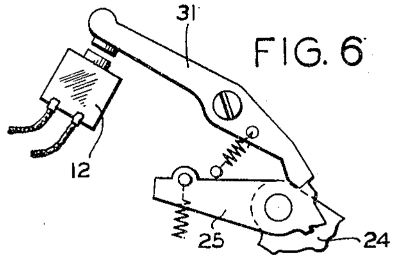
Fig. 6 is a fragmentary detail view of a portion of the registration control mechanism shown in Fig. 5.

Relay 12 (Figs. 1, 5 and 6) controlled by the electric sign signaling circuits is operated to trip the division control devices. Casing 7 which houses the switching means for the sign signaling circuits and their conductors is mounted on a cradle 48 (Figs. 2 and 5) in carriage 19 below numeral wheels 1. Normally cradle 48 is in the clockwise position shown in Fig. 5 thereby moving switch operating pins 8 from engagement with the respective cams 3 of the numeral wheels.

The pair of conducting strips 11 and 14 are transversely mounted in the body of the machine adjacent the rear underside of register carriage 19. Strip 14 is directly connected to one side of the power source as shown in Fig. 1 and strip 11 is connected to the other side through the winding of relay 12 and master switch 13. Conducting strips 11 and 14 are each engaged by a brush mounted on the underside of carriage 19 and conductors 49 and 50 (Figs. 1 and 2) from casing 7 respectively engage the brushes. Thus, a path of current flow is provided for the signaling circuits with carriage 19 in any shifted position.

Upon depression of the divide key (not shown) link 722 (Fig. 5) will be moved toward the front of the machine, and pin 722' on the link will engage and rock latch arm 725 counterclockwise to release crank 726. Crank 726 and an arm 732 are fast on a shaft 616 and are biased in clockwise direction by a relatively strong spring. Therefore, upon release of crank 726, the crank and arm 732 will be rocked clockwise and a link 733 attached to arm 732 will be moved toward the front of the machine. This movement of the parts will initiate subtractive operation of the driving means for the digit actuators and set various division controlling mechanisms, all as fully disclosed in the aforenoted Patent No. 2,531,207.

A link 730 pivotally attached at its lower end to one arm of crank 726 is adapted to enable and to disable shift control devices operable in connection with the division program. The upper end of link 730 has slot and pin connection at its upper end with a lever 52 which is fulcrumed at 53 to the left side of the machine frame. During operation of the carriage shift control devices, the slot and pin connection permits link 730 to be rocked about its connection with crank 726. Link 730 is normally in raised position (Fig. 5) and holds lever 52 in counterclockwise position. A bail 54, extending the length of carriage 19 is engaged by the left arm of lever 52 in any shifted position of the carriage. Upon the aforedescribed clockwise movement of crank 726, link 730 will be moved downward thereby rocking lever 52 clockwise and bail 54 counterclockwise. Thus, bail 54 will move the arms 46 upwardly a slight distance beyond the position shown in Fig. 5 and thereby move the register wheels 1 from aligned to crawl position.

A leaf spring 55 on the left arm of lever 52 engages cradle 48 in any shifted position of carriage 19. Therefore, upon clockwise movement of lever 52, cradle 48 will be rocked counterclockwise into engagement with a stop pin 48*a*. This movement is just sufficient to bring each switch operating pin 8 into engagement with the aforedescribed positive control dwell 15 of the associated switch control cam 3 if the cam is within that range. Therefore, both contacts 4 and 5 of the associated switching means will be open. If the cam is in the zero or negative control range, the switching means will be operated as described in connection with Fig. 1. Lever 52 and the parts adjusted thereby will be held in adjusted position by link 730 which is held in lowered position until completion of the division program.

When the registering mechanism has been cycled until the value in numeral wheels 1 has been reduced below zero, the switching means for the signaling circuits will be adjusted as described in connection with Fig. 1. At this time, however, a circuit will not be completed through the winding of relay 12 because of master switch 13 which is controlled as follows:

From a study of the range of the positive, negative and zero control dwells of cams 3, it has been determined that at about 15° before the end of a cycle of registration, contacts 4, 5, and 6 of the switching means (Fig. 1) will have been adjusted to the positions which will signify the conditions of the register wheels 1 at the end of the cycle. It is essential for high speed operation that the stopping means for the digital actuators be tripped before the actuators reach full cycle position; otherwise, the stopping means may fail to operate in time to prevent the actuators from effecting an extra cycle of operation. Therefore, when the digital actuators are approximately 15° from full cycle position in negative operation, a cam 56, driven by a suitable gear train at a one to one ratio with the actuators, operates to close master switch 13 as shown in Fig. 1 and, when the actuators have moved to within several degrees of full cycle position, the cam permits the master switch to reopen as shown in the full cycle position of the parts in Fig. 5. Therefore, if contacts 4, 5, and 6 of the switching means have been adjusted to signify an overdraft, the closure of master switch 13 will complete one of the signal circuits thereby operating relay 12 to trip the stopping means as follows:

An arm 22 (Fig. 5) pivotally mounted at its lower end is reciprocally operated in time with the register actuators by a link 21. An arm 24 has common pivotal mounting with arm 22 and is spring urged to the position shown in Fig. 5. A pawl 25 which is spring biased counterclockwise is mounted on the upper end of arm 24 and is held in the clockwise position shown in Fig. 5 by a trigger 31 which is spring biased clockwise. Upon operation of relay 12, trigger 31 will be moved counterclockwise thereby releasing pawl 25. Pawl 25 will, therefore, be moved counterclockwise and as the actuators pass through full cycle position, a shoulder 27 of arm 22 will engage pawl 25, thereby moving arm 24 against stop 29 as the actuators overrun beyond full cycle position. The movement of arm 24 against stop 29 will disconnect the actuator drive as described in Patent No. 2,531,207 and then will rebound in the reverse direction carrying arm 22 therewith to move the actuators reversely or in a positive direction. The actuator drive will then be reengaged for a positive corrective cycle of operation.

When the actuators passed negatively through full cycle position in the stopping operation, master switch 13 will have opened, thereby deenergizing relay 12. Trigger 31 will, therefore, be spring moved clockwise and thus, upon rebound of arm 24, trigger 31 will engage pawl 25 to disconnect it from shoulder 27 of arm 22. Shoulder 27 of arm 22 will therefore be free to move beneath pawl 25 to permit the positive corrective cycle of the actuators. However, upon movement of the actuators past full cycle position in the positive direction, master switch 13 will again be closed and at this time the numeral wheels will again be in the same position in which they were when the overdraft signal occurred. Relay 12 will, therefore, be energized again and the stopping means will be operated at the end of the single positive corrective cycle, the carriage shifted, and the division program resumed as disclosed in the aforenoted patent.

At the end of the division program, link 722, link 733, arm 732, crank 726, and latch 725 will be restored. Thus, link 730 will be moved upwardly to rock lever 52 counterclockwise to the normal position shown in Fig. 5. This movement will release bail 54 and arms 46 will be spring moved into engagement with cams 47, thereby moving numeral wheels 1 to aligned position. Also, cradle 48 will be released and pins 8 moved from engagement with switch control cam 3.

*Alternate electric sign signifying circuits*

The alternate arrangement of sign signifying circuits (Fig. 7) operates substantially on the same principles as set forth in connection with the circuits of Fig. 1. The alternate arrangement, however, includes positive as well as negative signaling circuits and a zero signaling circuit. The arrangement of Fig. 7 has been shown only schematically; it being only a matter of ingenuity and design to properly associate the circuits and controls therefor with the "crawl" tens transfer register.

Figures 7, 8:
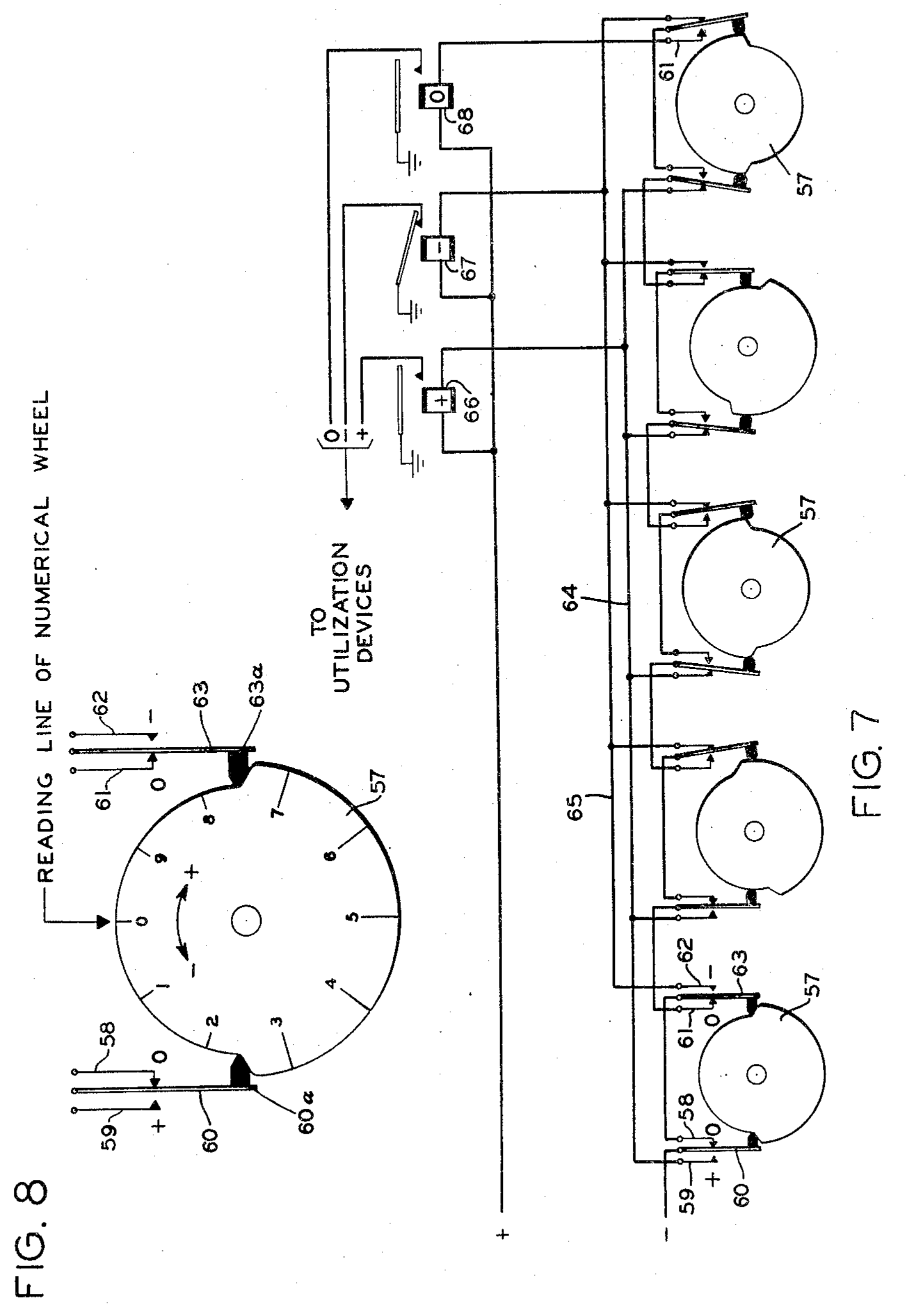
Fig. 7 is a schematic view of the alternate form of the invention which includes both the positive and the negative sign signalling circuits and the zero signaling circuit.
Fig. 8 is an enlarged side elevation of one of the switch control cams shown in Fig. 7.

Each of the register wheels has a switch control cam 57 attached for rotation therewith. As described in connection with Fig. 1, the highest order numeral wheel is a dummy or overflow wheel. Each cam 57 has oppositely disposed high and low portions of substantially equal range. In Fig. 8 the digital value numerals on the cam indicate the relation of the cam to the associated switching means when those values are registered on the numeral wheel to which it is attached.

A pair of switching units is controlled by each of the cams 57. One of the units comprises a zero signifying contact 58, a positive signifying contact 59 and a center contact 60 adapted to engage contact 58 or alternatively contact 59. The other unit comprises zero signifying contact 61, a negative signifying contact 62, and a center contact 63 adapted to engage contact 61 or alternatively, contact 62. The switch units are disposed at opposite sides of the associated cam and center contacts 60, 63 are provided with insulating pins *60a*, *63a* respectively. The center contacts are self-biased inwardly so as to urge their insulating pins into engagement with opposite edges of cam 57. When a numeral wheel is in zero position (Fig. 8), center contacts 60, 63 are engaged with zero contacts 58, 61 respectively.

The positive signaling circuits each have a common conductor 64 and the negative circuits each have a common conductor 65. Conductors 64 and 65 are connected to the same side of the power source through the windings of relays 66 and 67 respectively. The other side of the power source is directly connected to center contact 60 of the highest order switching means. Each positive contact 59 has direct connection with common conductor 64 and each negative contact has direct connection with a common conductor 65. Each zero contact 58 is connected to center contact 63 of the opposed switching unit and each zero contact 61 is connected to center contact 60 of the next lower order switching means. The zero contact 61 of the lowest order switching means is connected to one side of the power source through the winding of a relay 68.

When all of the numeral wheels stand at zero position all of the zero contacts 58 and 61 will be engaged with the center contacts 60 and 63 respectively. Therefore, all of the switching units will be connected in series with one side of the power source and the lowest order zero contact will be connected to the other side of the power source through the winding of relay 68. If any one of the wheels is moved from zero position in counterclockwise negative direction, center contact 63 will be disengaged from zero contact 61 and negative contact 62 will be engaged by center contact 63. The zero signaling circuit will therefore be broken and one of the negative signaling circuits will be completed. Conversely, if the wheel is moved in a positive direction, a positive signaling circuit will be completed and the zero circuit broken. If a wheel is moved positively or negatively past the 5 registering position, its cam will permit the switch giving the proper signal to open and will close the switch signifying the opposite or incorrect sign. In this event, the next higher order wheel, by virtue of the "crawl" transfer, will have moved its cam to close the proper switch and to break the connection with the lower order switching means. In Fig. 7 the cams of the lowest order and the third lowest order wheels both stand in approximately the same position. However, the lowest order cam has been positioned by a plus registration of 5 in its numeral wheel and the third lowest order by a minus registration of 5. It will be noted that both the positive and negative contacts of the switching means of both cams are closed. However, the "crawl" transfer to the wheel next to the overflow wheel has positioned its cam 57 to close the proper contact and to break the circuit to the lower order wheels. Relays 66, 67, and 68 may operate to control circuits for lights for indicating the condition of the register. For example, a green light would indicate that the register is in a positive state, an amber light in a zero state, and a red light in a negative state.

The hereindescribed uses of the signaling circuits are illustrative only of obvious applications. The invention, therefore, is not to be restricted to the specific application herein described, but is to be restricted only as necessitated by the scope of the appended claims.

We claim:

1. In a register including an ordinal series of numeral wheels and crawl tens transfer mechanism between said wheels; the combination of electric signaling circuit means, said circuit means comprising, a source of electrical power, two electrical conductor means each connected to an opposite side of said power source, switching means associated with each of said wheels, the switching means associated with the highest order wheel being connected to one of said conductor means, each switching means operable to make a first connection to the next lower order switching means to serially connect the successive lower order switching means with said one conductor means, and each successive lower order switching means operable to make a second connection from the second conductor means to said first connection from the next higher order switching means thereby completing a circuit, and an electroresponsive device in said circuit; with a switch controlling device operable by each of said wheels upon movement in a given direction from a first range of registration extending over a plurality of digital values to a zero control range of registration between 1 and 9 registering positions to control the operation of the associated switching means to make said first connection, upon movement from said zero range to a third range of registration extending over a second plurality of digital values to make said second connection, and upon movement from said third range to said first range of registration to break said first and said second connections.

2. In a register including an ordinal series of numeral wheels and crawl tens transfer mechanism between said wheels; the combination of electric signaling circuit means, said circuit means comprising, a source of electrical power, two electrical conductor means each connected to an opposite side of said power source, switching means associated with each of said wheels, the switching means associated with the highest order wheel being connected to one of said conductor means, each switching means operable to make a first connection to the next lower order switching means to serially connect the successive lower order switching means with said one conductor means, and each successive lower order switching means operable to make a second connection from the second conductor means to said first connection from the next higher order switching means thereby completing a circuit, and an electroresponsive device in said circuit; with a switch controlling device operable by each of said wheels; each having a positive, a zero and a negative control zone respectively for controlling operation of the associated switching means to break said first and said second connections, to make said first connection, and to make said second connection.

3. The invention according to claim 2 wherein said switch controlling device is rotatably operable by said wheel and each control zone comprises an arcuately extending portion thereof.

4. The invention according to claim 2 wherein said switch controlling device comprises a cam rotatably operable by said wheel and each control zone comprises a dwell.

5. In a register including an ordinal series of numeral wheels, crawl tens transfer between said wheels, and digital actuating mechanism for said wheels; the combination of electric signaling circuit means, said circuit means comprising, a source of electrical power, two electrical conductor means each connected to an opposite side of said power source, switching means associated with each of said wheels, the switching means associated with the highest order wheel being connected to one of said conductor means, each switching means operable to make a first connection to the next lower order switching means to serially connect the successive lower order switching means with said one conductor means, and each successive lower order switching means operable to make a second connection from the second conductor means to said first connection from the next higher order switching means thereby completing a circuit, a master switch and an electroresponsive device in said circuit, and means driven in timed relation with said digital actuating mechanism to open and to close said master switch; with a switch controlling device operable by each of said wheels upon movement in a given direction from a first range of registration extending over a plurality of digital values to a second or zero control range of registration between 1 and 9 registering positions to control the operation of the associated switching means to make said first connection, upon movement from said zero range to a third range of registration extending over a second plurality of digital values to make said second connection, and upon movement from said third range to said first range of registration to break said first and said second connections.

6. In a register including an ordinal series of numeral wheels and crawl tens transfer mechanism between said wheels; the combination of electric signaling circuit means, said circuit means comprising, a source of electrical power, two electrical conductor means each connected to an opposite side of said power source, switching means associated with each of said wheels, the switching means associated with the highest order wheel being connected to one of the conductor means, each switching means including a contact element operable to make a first connection to the next lower order switching means to serially connect the successive lower order switching means with said one conductor means and operable, upon making said first connection, to make a second connection from said second conductor means to said first connection thereby completing a circuit, and an electroresponsive device in said circuit; with a switch control cam rotatably operable by each of said wheels having a positive dwell for controlling operation of the contact element of the associated switching means to break said first and second connections, a zero dwell to make said first connection and a negative dwell to make said second connection.

7. In a register including an ordinal series of numeral wheels and crawl tens transfer mechanism between said wheels; the combination of electric signaling circuit means comprising, a source of electrical power, two electrical conductor means each connected to an opposite side of said power source, a pair of switches associated with each of said wheels, one switch of the pair associated with the highest order wheel being connected to one of the conductor means, one switch of each pair operable to make a first connection to the other switch of the pair and said other switch of the pair operable to make a first connection from said first connection to said one switch of the next lower order pair to serially connect the switches of each successive lower order pair with said one conductor means and each switch of the successive lower order pairs operable to make a second connection from the second conductor means to said first connection from the next higher order pair of switches thereby completing a circuit, and an electroresponsive device in said circuit; with a switch controlling device operable by each of said wheels upon movement to a zero range of registration between 1 and 9 registering positions to control operation of the associated pair of switches each to make said first connection and to break said second connection, upon movement from said zero range in one direction to break said first connection and to make said second connection of said one of the pair, and upon movement from said zero range in the other direction to break said first connection and to make said second connection of said other of the pair.

References Cited in the file of this patent

UNITED STATES PATENTS

| | | |
|---|---|---|
| 1,902,035 | Lake | Mar. 21, 1933 |
| 1,926,893 | Bryce | Sept. 12, 1933 |
| 2,339,616 | Chase | Jan. 18, 1944 |
| 2,416,369 | Avery | Feb. 25, 1947 |
| 2,558,721 | Allen et al. | July 3, 1951 |